United States Patent [19]

Hillis et al.

[11] Patent Number: 5,673,976
[45] Date of Patent: Oct. 7, 1997

[54] SPOKE NIPPLES, WHEELS INCLUDING SUCH NIPPLES, AND WRENCHES FOR SUCH NIPPLES

[75] Inventors: James R. Hillis, Lake Forest; Lee Kent Clark, Santa Ana, both of Calif.

[73] Assignee: Spline Drive, Inc., Lake Forest, Calif.

[21] Appl. No.: 389,057

[22] Filed: Feb. 15, 1995

[51] Int. Cl.$^6$ ........................................ B60B 1/14
[52] U.S. Cl. ................... 301/58; 411/405; 81/124.2; 81/124.4; 81/DIG. 7
[58] Field of Search ..................... 301/55, 58, 61, 301/104, 105.1; 411/405, 410; 81/119, 124.2, 124.4, DIG. 7

[56] References Cited

U.S. PATENT DOCUMENTS

| | | |
|---|---|---|
| 449,000 | 3/1891 | Schaap. |
| 520,845 | 6/1894 | Fay. |
| 593,128 | 11/1897 | Schroeder. |
| 644,968 | 3/1900 | Crawford et al.. |
| 661,376 | 11/1900 | Marshall ................. 301/58 |
| 693,011 | 2/1902 | Hawk. |
| 1,224,875 | 5/1917 | Zarth. |
| 1,322,331 | 11/1919 | Needham ............... 81/124.4 |
| 1,640,383 | 8/1927 | Thomas .................... 81/119 |
| 1,734,184 | 11/1929 | Stoler ..................... 301/58 X |
| 2,328,201 | 11/1943 | Decker, Jr.. |
| 3,003,379 | 4/1961 | Pribitzer. |
| 4,361,412 | 11/1982 | Stolarczyk. |
| 5,295,422 | 3/1994 | Chow. |

FOREIGN PATENT DOCUMENTS

| | | | |
|---|---|---|---|
| 870458 | 3/1942 | France .................. 301/104 |
| 2515559 | 5/1983 | France. | |
| 81801 | 4/1986 | Japan ...................... 301/58 |
| 0806391 | 2/1981 | U.S.S.R.. | |
| 1220923 | 1/1971 | United Kingdom. | |

Primary Examiner—Russell D. Stormer
Attorney, Agent, or Firm—Frank J. Uxa

[57] ABSTRACT

Nipples, for example, useful in joining a spoke to the rim of a bicycle wheel, are provided. Such nipples include an enlarged head, and an elongated shank joined to and extending from the enlarged head and having an outer peripheral surface; and a passageway including an inlet defined by the elongated shank. The passageway is at least partially defined by an interior surface of the elongated shank and by a threaded surface. The outer peripheral surface of the elongated shank includes at least one spline, preferably a plurality of splines, each of which extends generally longitudinally. The inclusion of such spline or splines has been found to allow the nipple to be turned so as to effectively tighten the spoke to the rim with a reduced risk of damaging the nipple. Apparatus useful for turning such nipples and spoked wheels including such nipples are also within the scope of the present invention.

20 Claims, 2 Drawing Sheets

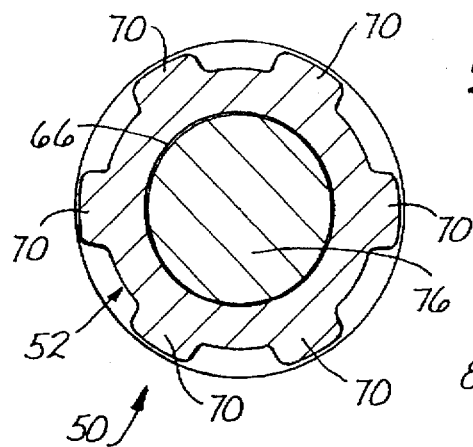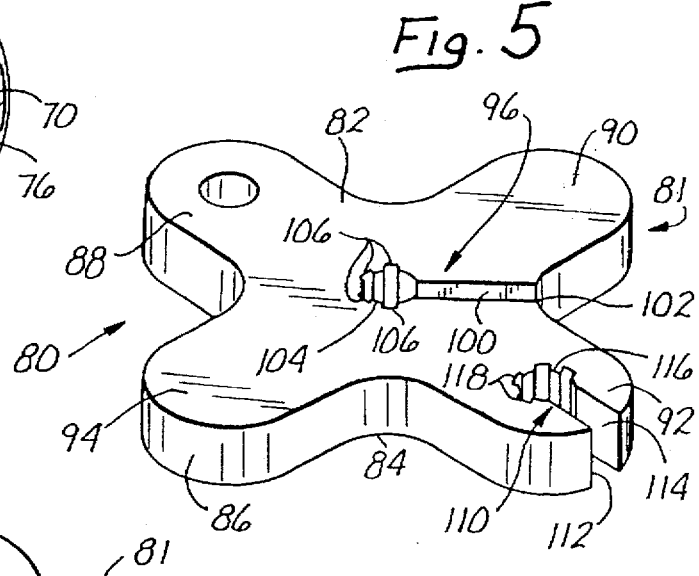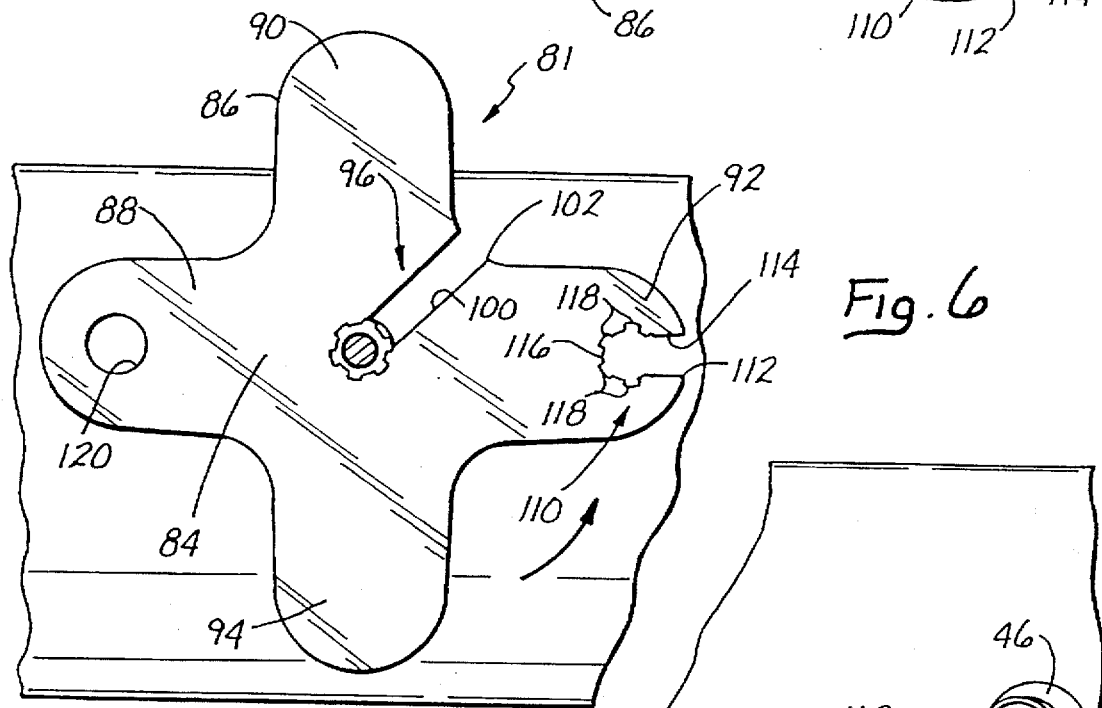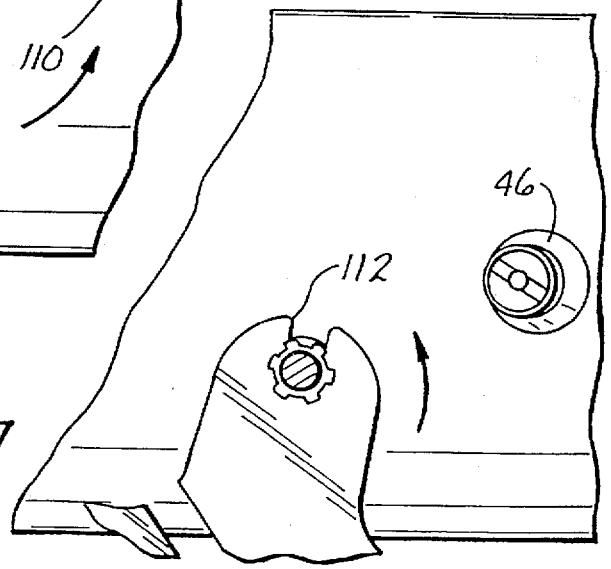

SPOKE NIPPLES, WHEELS INCLUDING SUCH NIPPLES, AND WRENCHES FOR SUCH NIPPLES

BACKGROUND OF THE INVENTION

The present invention relates to spoked wheels, to nipples used to secure spokes to wheel frames, and to wrenches useful to tighten spokes to the wheel frames. More particularly, the invention relates to such nipples and wrenches which are structured and adapted to provide benefits in tightening or securing the spokes to wheel frames and/or in using the spoked wheels including the nipples.

Nipples are widely used today to tighten spokes to a wheel frame, for example, a bicycle wheel frame. In essence, a nipple is used by passing it through a hole in the wheel rim and then joining the spoke to the depending portion of the nipple. The nipple is rotated to tighten the spoke to the wheel rim to the desired extent. Such nipples are commonly made of relatively heavy metal, such as brass, to provide durability and strength. Lighter metals, such as aluminum, and relatively light polymeric materials would be advantageous, because of their light weight, provided that nipples made from such materials can be made to overcome certain problems.

One of the biggest problems with such spoke nipples has heretofore been in tightening the spokes. For example, such spoke nipples are often constructed so as to have a four sided flat drive, such as a drive having a square cross section. As used herein, the term "drive" refers to that portion of the nipple which is grasped by a wrench or other tool in turning the nipple, for example, to tighten the spoke to the wheel frame. During the turning/tightening operation, the tool or wrench strips or otherwise wears or rounds the edges of the flats so that, over a relatively short period of time, it becomes much more difficult, and even impossible, to effectively turn the nipple. Ultimately, the nipple becomes unusable and must be replaced, which is a time consuming job. Also, the worn or rounded flats may result in the spokes not being effectively tightened. In this case, the spokes may become loose during use of the spoked wheel, which causes the wheel to buckle with disadvantageous consequences, for example, injuries to riders of bicycles including such spoked wheels.

It would be advantageous to provide spoke nipples and/or turning tools which can be effectively used with reduced risk of physical damage to the nipples and of failure during use of wheels including such nipples.

SUMMARY OF THE INVENTION

New spoke nipples, apparatus for turning such spoke nipples and wheels including such spoke nipples have been discovered. The present nipples are structured and adapted with a spline drive so as to be turned with a reduced risk of being physically damaged, for example, relative to a similar nipple having a four sided flat drive. The present nipples are relatively easy to effectively and securely tighten to the spokes so that a reduced risk of the spoke becoming loose during use exists, for example, relative to nipples having a conventional four sided flat drive. The structure of the present nipples allows the use of materials of construction which are light weight, for example, lighter or less dense than brass, without sacrificing effectiveness in tightening the spokes and in holding the spokes to the wheel frame.

The present nipple turning tools or wrenches are structured for use with the present nipples. Thus, the present tools or wrenches facilitate effectively and securely tightening the spokes to the nipples without damaging the nipples. In addition, the present wrenches are of sufficiently small size to be used between the spokes of a wheel. Also, in a preferred embodiment, the wrenches are structured to provide for additional turning leverage and/or for use in situations where it is difficult to turn the nipple, for example, when the spoke is located in close proximity to the air valve stem of the wheel tire.

The spoked wheels including the present nipples provide substantial advantages. For example, because the present nipples are resistent to physical damage, they can be used repeatedly, even after being placed on the wheel, to effectively "tune" the wheel to the desired degree of spoke tightness. In addition, such spoked wheels are more secure in use since the spokes are less likely to loosen from the nipples. Also, the present spoked wheels are preferably lighter in weight than the conventional spoked wheel, for example, because of the use of light weight materials to produce the spoke nipples.

In one broad aspect of the present invention, nipples, such as spoke nipples, are provided. The nipples comprise an enlarged head, for example, to be joined to the rim of a spoked wheel, an elongated shank which includes a spline drive and a passageway. The elongated shank is joined to and extends from the enlarged head, for example, extending toward the hub of the spoked wheel when in use, has an outer peripheral surface, and defines an inlet. The passageway includes the inlet and is at least partially defined by an interior surface of the elongated shank and a threaded surface. The outer peripheral surface includes one or more splines each of which extends generally longitudinally. It has been found that the use of a spline drive, that is at least one spline, preferably a plurality of spaced apart splines, on the outer peripheral surface of the elongated shank is effective in enhancing the ability to turn or rotate the nipples. For example, using such an outer peripheral surface including one or more splines, the nipple can be turned to securely, even more securely, tighten a spoke to the nipple and the wheel frame with a reduced risk of physically damaging the nipple, relative to a similarly sized and structured nipple which has a four sided flat drive.

Without wishing to limit the invention to any particular theory of operation, it is believed that the use of one or more splines reduces the concentration of stresses or forces at any one particular point on the outer peripheral surface of the nipple, thereby reducing the risk that any one particular point on this outer peripheral surface will give way, e.g., become worn or rounded, as a result of being turned.

The outer peripheral surface of the elongated shank more preferably includes about 3 to about 8 of the spaced apart splines, with excellent results being achieved with an outer peripheral surface including about 6 of the spaced apart splines.

The present nipples may be made of any suitable material or combination of materials. The nipples are preferably made of a material selected from the group consisting of metals, such as brass, steel, stainless steel, aluminum, titanium and the like, and polymeric materials. In a particularly useful embodiment, the nipple is made of a material, or combination of materials, having a density less than the density of brass. This feature allows the use of lightweight materials without reducing the effectiveness of the nipples in use. One particularly useful material of construction for the present nipples is aluminum, for example, 2024-T4 aluminum.

The spline or splines are preferably sized to facilitate rotating the nipple relative to the spoke of a wheel, the end of which spoke is passed through the inlet defined by the elongated shank, for example, and engages the threaded surface of the passageway. The spline or splines preferably have a width generally parallel to the longitudinal axis of the elongated shank and has a depth or height generally transverse to this longitudinal axis. In one embodiment, the width of each spline is in the range of about 0.002 inch to about 0.03 inch, for example, about 0.01 inch; and the depth of each spline (measured from the outer peripheral surface of the elongated shank adjacent the spline) is in the range of about 0.001 inch to about 0.010 inch or about 0.015 inch. The width of the spline is preferably larger than the depth of the spline. Although the spline or splines can extend over the entire length of the outer peripheral surface of the elongated shank, in a preferred embodiment, the spline or splines extend over only a portion of the length of this outer peripheral surface. This feature allows the spline or splines to facilitate the turning of the nipples without causing any damage to the rim of the wheel. The portion or portions of the nipples adapted to be in contact with, or in close proximity to, the rim of the wheel are preferably substantially smooth to further reduce the risk of damaging such portion or portions of the nipples and the wheel frame, e.g., rim.

The enlarged head and elongated shank may have any suitable configurations provided that the nipple is capable of functioning as described herein. In one useful embodiment, the enlarged head has a generally circular cross-section (transverse to the longitudinal axis of the nipple) which varies in size along the length of the enlarged head. The maximum straight line dimension of the enlarged head transverse to the longitudinal axis of the nipple is preferably in the range of about 0.05 inch to about 0.5 inch, for example, about 0.25 inch. In one embodiment, each of the outer peripheral surface of the elongated shank and the passageway has a generally right circular cylindrical configuration. The maximum straight line dimension, e.g., diameter, of the elongated shank transverse to the longitudinal axis of the spoke nipple is preferably in the range of about 0.03 inch to about 0.4 inch, for example, about 0.15 inch. The length of the nipple is preferably in the range of about 0.15 inch to about 1 inch, for example, about 0.45 inch.

In another broad aspect of the present invention, apparatus for rotating a nipple, such as a nipple described herein, having an outer peripheral surface including at least one spline extending generally longitudinally are provided. Such apparatus comprise a base member and a split or slot. The base member includes a first side, a substantially opposing second side and a peripheral wall located between the first and second sides. The split or slot is located in the base member and passes through the first and second sides. This slot includes an inlet in the peripheral wall and an enlarged portion spaced apart from the inlet. The slot is preferably sufficiently large to allow a spoke to pass through, for example, from the inlet to the enlarged portion.

The enlarged portion is configured to engage a portion of the outer peripheral surface of the nipple including the at least one spline so that when the enlarged portion is so engaged the nipple rotates in response to the base member being rotated. In a preferred embodiment, the nipple includes a plurality of spaced apart splines each of which extends generally longitudinally, and the enlarged portion is configured to engage a portion of the outer peripheral surface of the nipple including more than one of the spaced apart splines. The enlarged portion may be said to include one or more indents shaped or configured as inverted or internal splines corresponding to the external spline or splines on the nipple so as to engage the spline or splines of the nipple when it is desired to turn or rotate the nipple.

The tool or wrench is preferably made from a hardened material, preferably selected from metals, that has an internal spline drive that matches the external spline drive on the nipples. The tool is preferably made as a unitary structure with no parts moving relative to each other.

In a particularly useful embodiment, the present rotating apparatus, e.g., tool or wrench, further comprises an additional split or slot spaced apart from the split or slot and structured similarly, though preferably not identically, to the split or slot. More preferably, the slot is longer than the additional slot. The additional slot is preferably situated in the base member so that it can be used more effectively (then the slot) to facilitate the rotation of nipples located in "hard-to-get-at" locations, for example, such as in close proximity to the air valve stem of a tire on the wheel and in close proximity to one or more other spokes of the wheel.

In a very useful embodiment, the wrench or tool is configured so that additional leverage is available when the nipple is engaged to the additional slot relative to the leverage available when the nipple is engaged to the slot.

After the tool or wrench is placed around the nipple, the spoke can be tightened to the nipple by turning the tool in a wrenching motion. The nipple is turned or rotated until the desired degree of spoke tightness is achieved or until the tool or wrench comes in contact with another spoke or the air valve stem. The tool or wrench is then pulled off the nipple. If additional spoke tightening is desired, the tool is placed back on the nipple at the wrenching position and the above procedure is repeated until the desired spoke tightness is achieved. This repeated wrenching motion is the same as whenever a nut or bolt is tightened down in a close or confined area.

The base element preferably further includes a through hole spaced apart from the split or slot and the peripheral wall which extends through the first and second sides. This through hole may be used to attach the apparatus to a key chain or the like device so that the tool or wrench can be carried with the bicycle rider and used when necessary or desired.

The maximum transverse, i.e., straight line, dimension of the base element is preferably in the range of about 0.5 inches to about 2.5 inches, and more preferably about 1.5 inches.

A particularly useful configuration for the present tool or wrench is with the first and second sides and the peripheral wall defining four (4) substantially equally spaced apart lobes. In this "lobe" configuration, the enlarged portion of the slot is preferably substantially centrally located relative to the spaced apart lobes. The additional slot, if any, is preferably located in one of the spaced apart lobes. If the above-noted through hole is included, it is preferably located in another one of the spaced apart lobes.

Spoked wheels comprising a rim spaced apart from and surrounding a wheel hub, a plurality of spokes each of which is joined to the rim and a plurality of nipples, for example, as described herein, each of which is positioned to join one of the spokes to the rim are included within the scope of the present invention.

These and other aspects and advantages of the present invention will become apparent in the following detailed description and claims, particularly when considered in conjunction with the accompanying drawings in which like parts bear like reference numerals.

BRIEF DESCRIPTION OF THE DRAWINGS

FIG. 4 is a cross-sectional view taken generally along line 4—4 of FIG. 3.

FIG. 5 is a top front view, in perspective, of a nipple wrench in accordance with the present invention.

FIG. 6 is a plan view showing the nipple wrench in use to tighten a spoke.

FIG. 7 is a partial plan view showing the nipple wrench in use to tighten another spoke.

DETAILED DESCRIPTION OF THE DRAWINGS

Figure 1:
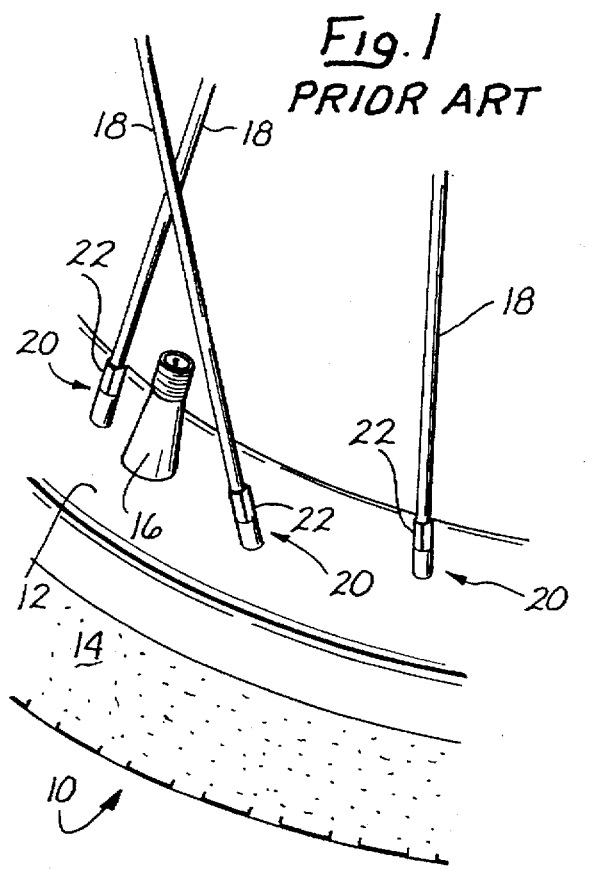
FIG. 1 is a partial view, in perspective, of a spoked wheel including prior art spoke nipples.

The prior art with respect to spoke nipples is illustrated in FIG. 1 which shows a spoked wheel, identified generally at 10. The spoked wheel 10, such as that used on a bicycle or other transportation vehicle, includes a wheel rim 12, a wheel tire 14 on the wheel rim with an air valve stem 16 passing through a hole in the wheel rim, and a series of spokes 18. Each spoke 18 is joined to the wheel rim 12 using a spoke nipple 20 which extends out of a hole in the wheel rim and receives the threaded end portion of a spoke. Each of the spoke nipples 20 includes an interior surface with threads which engage or mate with the threads of the threaded end portion of a spoke 18. Thus, by rotating the spoke nipple 20, the spoke 18 is tightened to the spoke nipple and the wheel rim 12. Each of the spokes 18 is also secured to a wheel hub (not shown) which is spaced apart from and substantially surrounded by the wheel rim 12.

Each of the prior art spoke nipples 20 is made of brass and includes a four sided flat drive 22 which is grasped by a wrench and rotated to rotate the spoke nipple and tighten the spoke 18. Initially, this four sided flat drive 22 is square in cross-section and is effective in rotating the spoke nipple 20. However, after a relatively short period of time, the flats on the drive 22 become rounded or otherwise worn by the action of the wrench so that it becomes increasingly difficult, if not impossible, to effectively tighten the spokes 18. As discussed previously, failure to effectively tighten the spokes 20 can result in the spokes becoming loose during use which, in turn, can cause injuries to the user of the spoked wheel 10.

The present invention, illustrated in FIGS. 2 to 7, addresses these and other problems and concerns of the prior art.

Figure 2:
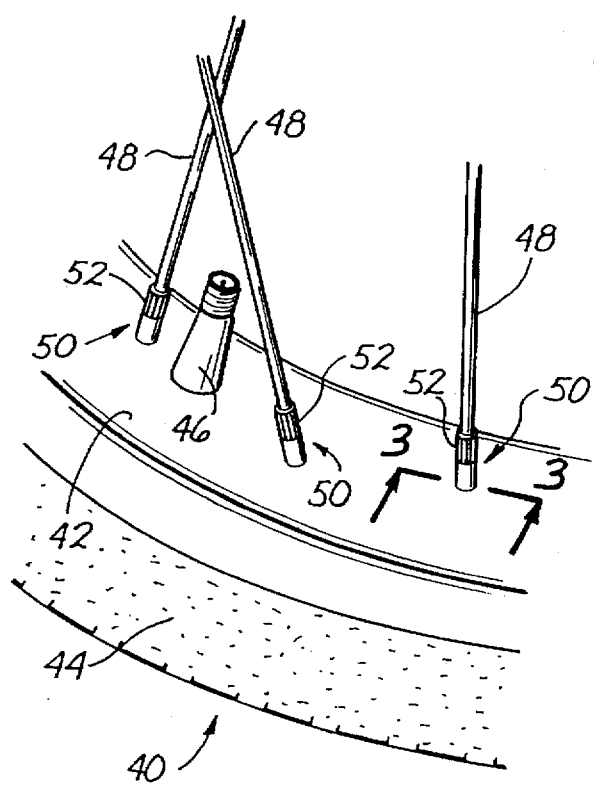
FIG. 2 is a partial view, in perspective, of a spoked wheel including spoke nipples in accordance with the present invention.

FIG. 2 depicts a spoked wheel, shown generally at 40, which includes a wheel rim 42, a wheel tire 44 with an air valve stem 46 passing through and extending from a hole in the wheel rim, and a series of spokes 48. Each of these components of spoked wheel 40 is structured and functions similarly to the corresponding component of spoked wheel 10. Each of the spokes 48 is secured to a wheel hub (not shown) which is spaced apart from and substantially surrounded by the wheel rim 42. Each of the spokes 48 is held or joined to wheel rim 42 using a spoke nipple 50 in accordance with the present invention. Each spoke nipple 50 is made of light weight (relative to brass) 2024-T4 aluminum, and includes a spline drive 52.

Figure 3:
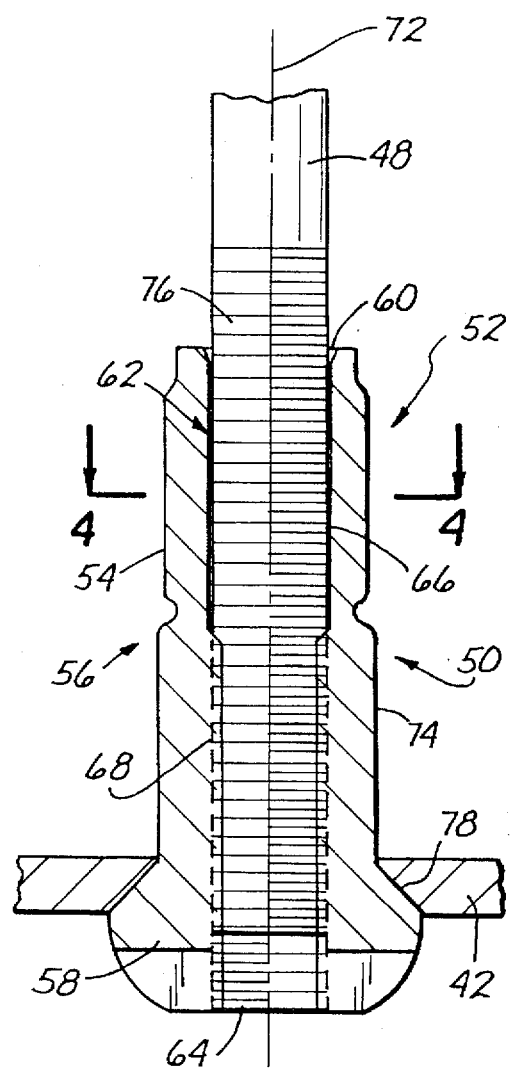
FIG. 3 is a partial cross-sectional view taken generally along line 3—3 of FIG. 2.

FIGS. 3 and 4 show the structure of a spoke nipple 50 in more detail. Spoke nipple 50 is a unitary structure made of 2024-T4 aluminum, and includes spline drive 52 on an outer peripheral surface 54 of an elongated shaft 56 and an enlarged head portion 58. The elongated shaft 56 defines an inlet 60 and a through passageway 62 which extends from and includes inlet 60 to and including outlet opening 64 in enlarged head portion 58. Passageway 62 is defined by an interior surface 66 of elongated shaft 56 and a threaded surface 68 of the elongated shaft. The outer peripheral surface 54, interior surface 66 and threaded surface 68 are each generally right circular cylindrical in configuration. Enlarged head portion 58 has a generally circular cross-section transverse to the longitudinal axis 72 of the nipple 50 which varies in size along its length. Typical dimensions of the various components of nipple 50 are as discussed elsewhere herein. The interior surface 66 is substantially smooth.

Outer peripheral surface 54 of elongated shaft 56 includes a series of six (6) splines 70 which extend longitudinally. Each of these spaced apart splines 70 is similarly configured and has a width generally parallel to the longitudinal axis 72 of spoke nipple 50 and a depth generally transverse to the longitudinal axis. The width of the splines 70 is larger than the depth of the splines. Further, each of the splines 70 extends longitudinally along only a portion of the outer peripheral surface 54 of the elongated shaft 56. The portion 74 of the outer peripheral surface 54 of elongated shaft 56 adjacent to enlarged head portion 58 does not have any splines and is substantially smooth.

As shown in FIG. 3, the threaded portion 76 of spoke 48 is passed through inlet 60 into passageway 62. The threaded portion 76 of spoke 48 includes threads sized and adapted to engage the threads on threaded surface 68 of passageway 62. Thus, by rotating spoke nipple 50 relative to spoke 48, with enlarged head portion 58 being restricted or carried by wheel rim 42, the spoke 48 is passed further into passageway 62. In this manner, spoke 48 is tightened to spoke nipple 50 and wheel rim The rotation of spoke nipple 50 relative to spoke 48 is facilitated by spline drive 52, as is discussed hereinafter. The substantially smooth surface 74 advantageously allows the rotation of spoke nipple 50 without unduly interfering with the wheel rim 42 and in particular with the hole 78 in the wheel rim through which the spoke nipple extends.

FIGS. 5, 6 and 7 illustrate the structure and functioning of a wrench, shown generally at 80, adapted for use with spoke nipples 50.

Wrench 80 includes a base member 81 having first side 82, a second side 84 and a peripheral surface 86 between the first and second sides. Wrench 80 is a unitary structure and includes no components which move relative to each other. First side 82, second side 84 and peripheral surface 86 are configured so that the base member 81 of wrench 80 includes four (4) equally spaced apart lobes 88, 90, 92 and 94. The maximum transverse or straight line dimension of wrench 80, say from the extreme tip of lobe 90 to the extreme tip of lobe 94, is preferably in the range of about 0.5 inch to about 2.5 inches, more preferably about 1.5 inches.

Base member 81 includes two (2) splits or slots extending from the peripheral surface 86 inwardly. First slot 96 passes through first side 82 and second side 84 and includes an elongated portion 100 which extends from the first inlet 102 in the peripheral surface 86 and leads to enlarged portion 104 of the first slot. Enlarged portion 104 of first slot 96 is configured to include four (4) internal splines which are spaced apart, arranged and sized to engage the splines 70 of the spline drive 52 of spoke nipple 50.

Second slot, identified generally at 110, is located in lobe 92. Second slot 110 extends from second inlet 112 in peripheral surface 86 inwardly. Passageway 110 includes a shortened portion 114 which extends from second inlet 112 and leads to second enlarged portion 116. Shortened portion 114 is substantially shorter than elongated portion 100 of first slot 96. Second enlarged portion 116 includes four (4) internal splines 118 which are spaced apart, arranged and sized to engage the external splines 70 of spline drive 52 of spoke nipple 50.

An additional structural feature of wrench 80 is a through hole 120 in lobe 88 which extends from first side 82 to and through second side 84 and is spaced apart from peripheral surface 86. Through hole 120 can be used to attach wrench 80 to a keychain or similar device so that the wrench can be carried on the person of the user, for example, a bicycle rider.

FIGS. 6 and 7 illustrate the operation and functioning of spoke nipples 50 and wrench 80. Referring now to FIG. 6, when a spoke 48 is to be located away from other spokes and the air valve stem 46, such as the spoke to the far right in FIG. 2, the first slot 96 of base member 81 is employed. The elongated portion 100 has sufficient width to allow the spoke 48, the threaded end of which is already loosely joined to spoke nipple 50, to be passed from first inlet 102 through the elongated portion into enlarged portion 104. Having accomplished this, the wrench 80 is then placed on the spoke nipple 50 so that the internal splines 106 engage the external splines 70 of spline drive 52. The wrench 80 is then manually rotated so as to tighten the spoke 48 to the wheel rim 42 to the extent desired. The shape and size of wrench 80 is such that the wrench can be passed through a complete rotation without encountering any obstacles, for example, another spoke 48 or air valve stem 46. However, in the event the wrench 80 cannot be passed through a complete rotation without contacting such an obstacle, the wrench is rotated to the extent possible, is then removed from the nipple, turned back to its original position, placed back on the nipple and again rotated to the extent possible. This procedure is continued until the spoke 48 is tightened to the extent desired. At this point, the wrench 80 is removed from the spoke nipple 50 and the wrench is passed so that the spoke passes through the elongated portion 100 and out the first inlet 102. At this point, the spoke 48 is ready for use.

FIG. 7 demonstrates the use of the second slot 110 in tightening a spoke 48 to the wheel rim 42. The use of second slot 110 is employed when the spoke 48 is in a confined or close space, such as in close proximity to air valve stem 46. This is demonstrated by the spoke to the far left in FIG. 2.

The spoke 48 is passed through the second inlet 112 through the shortened portion 114 and into the second enlarged portion 116. At this point, the wrench 80 is then joined to the spoke nipple 50 so that the internal splines 118 join the external splines 70 of spline drive 52. The wrench 80 is then rotated until it contacts the air valve stem 46. At this point, the wrench 80 is removed from the spoke nipple 50, placed back in its original position, rejoined to the spoke nipple and rotated again until it encounters the air valve stem 46. This procedure is continued until the spoke 48 is tightened to the desired degree. The wrench 80 is then removed from the spoke nipple 50 and from the spoke 48. At this point the spoke 48 is ready for use.

One additional feature of using the second slot 110 is that additional turning leverage is available relative to using first slot 96.

The present spoke nipples, wrenches and spoked wheels including such spoke nipples provide substantial advantages and benefits. The present spoke nipples are easily and effectively employed to securely tighten spokes to a wheel frame. The present spoke nipples are resistent to physical damage so that they can be used repeatedly and effectively, thereby reducing, or even eliminating, the risk that the spokes will become loosened and result in injury to a bicycle rider. The present spoke nipples and wrenches for use with such spoke nipples are of straightforward construction and can be conveniently, easily and effectively used. The spoke nipples can be, and preferably are, made from lightweight materials thereby advantageously reducing the weight of the bicycle employing such spoke nipples.

While this invention has been described with respect to various specific examples and embodiments, it is to be understood that the invention is not limited thereto and that it can be variously practiced within the scope of the following claims.

What is claimed is:

1. A nipple comprising:
    an enlarged head;
    an elongated shank joined to and extending from said enlarged head, having an outer peripheral surface and defining an inlet;
    a passageway including said inlet and being at least partially defined by an interior surface of said elongated shank and a threaded surface; and
    said outer peripheral surface including a plurality of splines, said splines being spaced apart and generally extending longitudinally.

2. The nipple of claim 1 wherein said outer peripheral surface includes about 6 of said spaced apart splines.

3. The nipple of claim 1 which is made of a material having a density less than the density of brass.

4. The nipple of claim 1 which is made of a material selected from the group consisting of metals and polymeric materials.

5. The nipple of claim 1 which is made of aluminum.

6. The nipple of claim 1 wherein said elongated shank has a longitudinal axis, and at least some of said plurality of splines have a width generally parallel to said longitudinal axis and a depth generally transverse to said longitudinal axis, and said width is larger than said depth.

7. The nipple of claim 1 wherein at least some of said splines extend over only a portion of the length of said outer peripheral surface.

8. The nipple of claim 1 wherein said plurality of spaced apart splines are sized to facilitate rotating said nipple relative to the spoke of a wheel, the end of which spoke is passes through said inlet.

9. The nipple of claim 8 wherein the threaded surface of said passageway is configured to engage an externally threaded surface of a spoke, the end of which spoke is passed through said inlet in said passageway to engage said threaded surface.

10. The nipple of claim 1 wherein said threaded surface is an interior surface of said enlarged head.

11. An apparatus for rotating a spoke nipple for a cycle having an outer peripheral surface including a plurality of splines extending generally longitudinally, said apparatus comprising:
    a base member including a first side, a substantially opposing second side and a peripheral wall between said first and second sides;
    a slot located in said base member and passing through said first and second sides, said slot including an inlet in said peripheral wall and having a slot width that is sufficiently large to allow a spoke of said cycle through and extending to an enlarged portion which is spaced apart from said inlet; and said enlarged portion being larger than said slot width and being configured to engage a portion of the outer peripheral surface of the nipple including at least one of the plurality of spaced apart splines so that when said enlarged portion is so engaged the nipple rotates in response to said base member being rotated.

12. The apparatus of claim 11 which further comprises an additional slot spaced apart from said slot and structured similarly to said slot.

13. The apparatus of claim 12 wherein said slot is longer than said additional slot.

14. The apparatus of claim 13 which is configured so that additional leverage is available when the nipple is engaged to said additional slot relative to the leverage available when the nipple is engaged to said slot.

15. The apparatus of claim 13 wherein said first and second sides and said peripheral wall define four substantially equally spaced apart lobes; said enlarged portion of said slot being substantially centrally located relative to said spaced apart lobes, said additional slot being located in one of said spaced apart lobes; and said base element further includes a through hole spaced apart from said peripheral wall, extending through said first and second sides and located in another one of said spaced apart lobes.

16. The apparatus of claim 11 wherein said base element further includes a through hole spaced apart from said slot and said peripheral wall and extending through said first and second sides.

17. The apparatus of claim 11 wherein the maximum transverse dimension of said base member is in the range of about 0.5 inches to about 2.5 inches.

18. The apparatus of claim 11 wherein said first and second sides and said peripheral wall define four substantially equally spaced apart lobes.

19. A wheel comprising:

a rim spaced apart from and surrounding a wheel hub;

a plurality of spokes extending from the wheel hub, each of which is joined to said rim;

a plurality of nipples each of which is positioned to join one of said spokes to said rim, each of said nipples comprising:

an enlarged head, said head being relatively flat and having a smooth surface;

an elongated shank joined to and extending from said enlarged head, having an outer peripheral surface and defining an inlet;

a passageway including said inlet and being at least partially defined by an interior surface of said elongated shank and a threaded surface; and said outer peripheral surface including a plurality of splines which extend generally longitudinally.

20. A spoke nipple for use in joining a spoke to a wheel comprising:

a head portion, said head portion being relatively flat and having a smooth surface; and an elongated shaft in connection with and extending away from said head portion along a longitudinal axis and being configured to pass through a spoke nipple hole in the wheel, said elongated shaft having an outer surface and a generally hollow inner surface, said inner surface being at least partially internally threaded for engagement with a spoke;

wherein said outer surface includes a plurality of equally spaced apart splines each of which have a length, a width and a generally flat upper surface which generally define a rectangular shape, said splines having a greater length than width and generally extending along said longitudinal axis; and wherein said head portion has a generally circular cross-section transverse to the longitudinal axis which is larger in diameter than said spoke nipple hole.

* * * * *